June 28, 1949.　　　　R. SAULNIER　　　　2,474,694
RETRACTABLE LANDING GEAR FOR AIRCRAFT
Filed Oct. 6, 1945　　　　　　　　　　　　　10 Sheets-Sheet 1
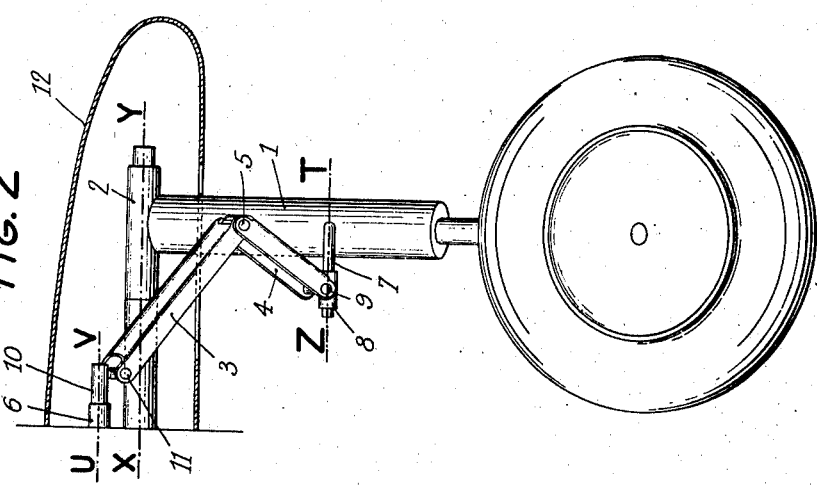
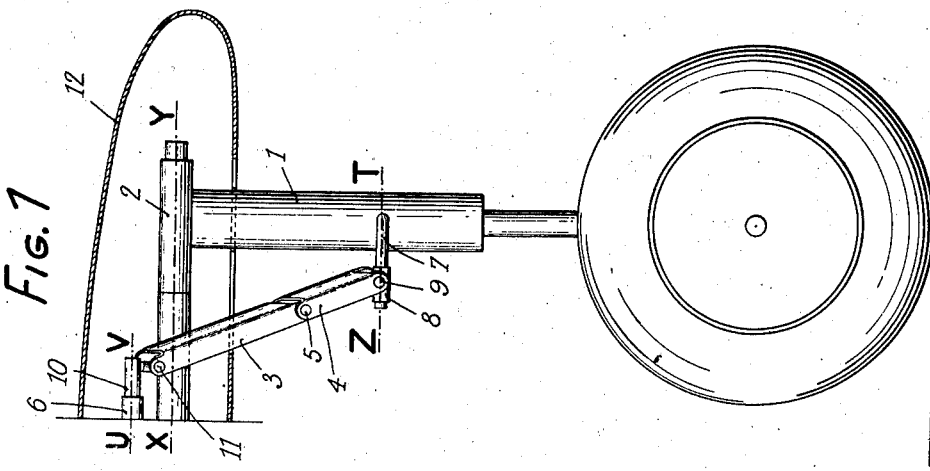
Inventor:-
Raymond Saulnier
By Brown & Deward
Attorneys June 28, 1949.    R. SAULNIER    2,474,694
RETRACTABLE LANDING GEAR FOR AIRCRAFT
Filed Oct. 6, 1945    10 Sheets-Sheet 2
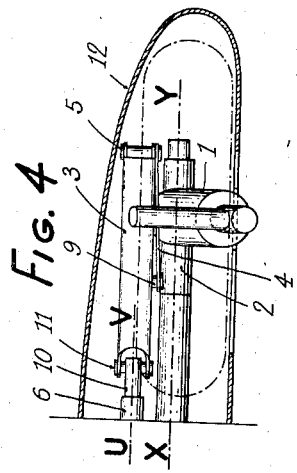
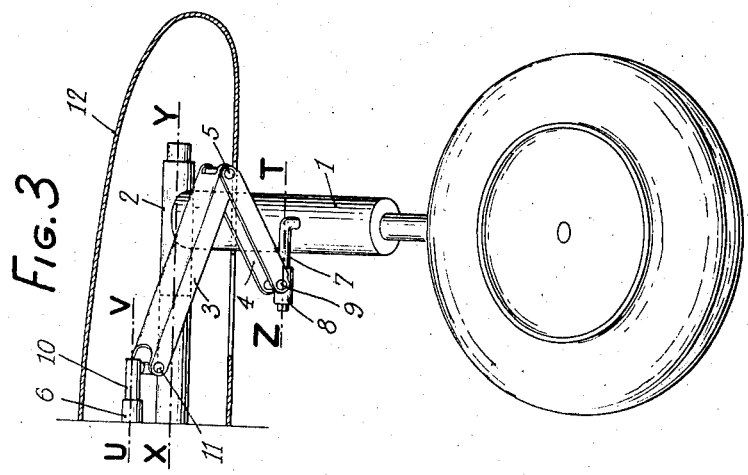
Inventor:-
Raymond Saulnier
By Brown & Deward
Attorneys

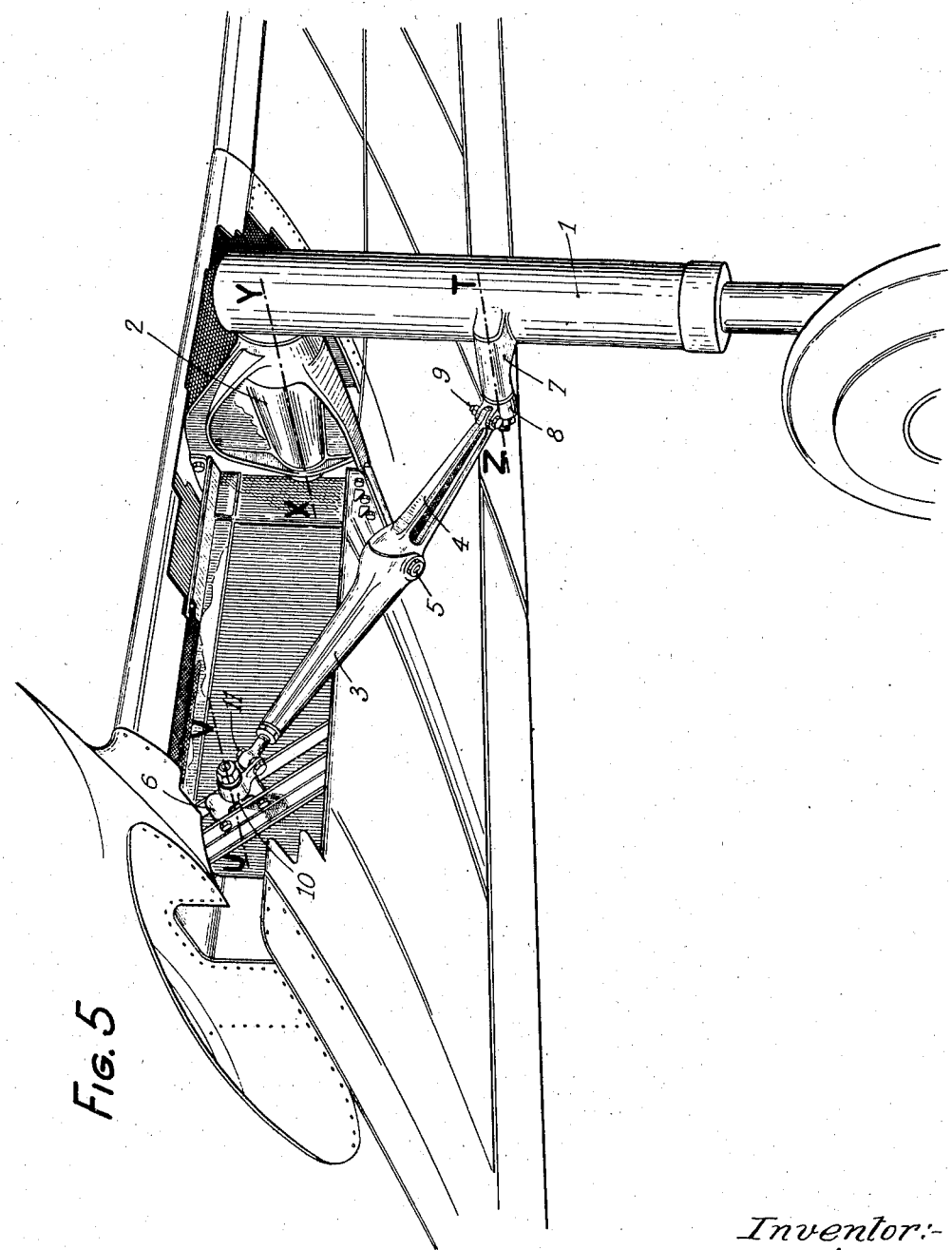

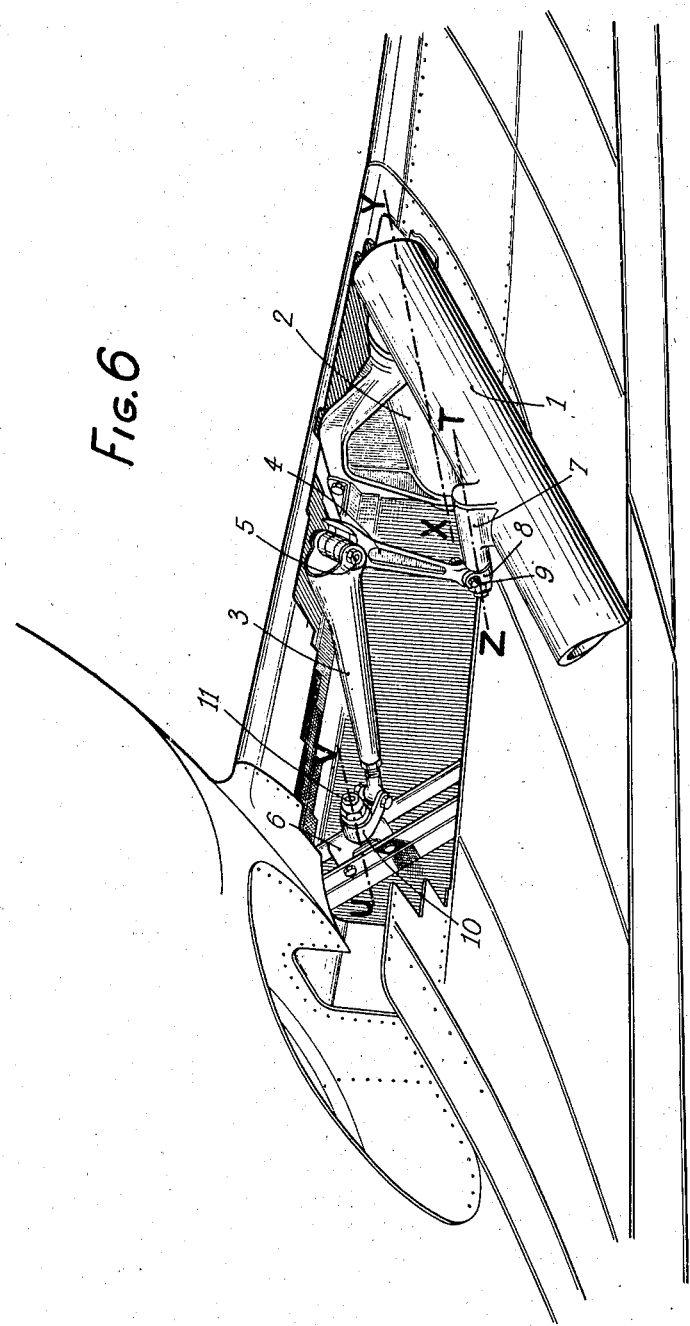

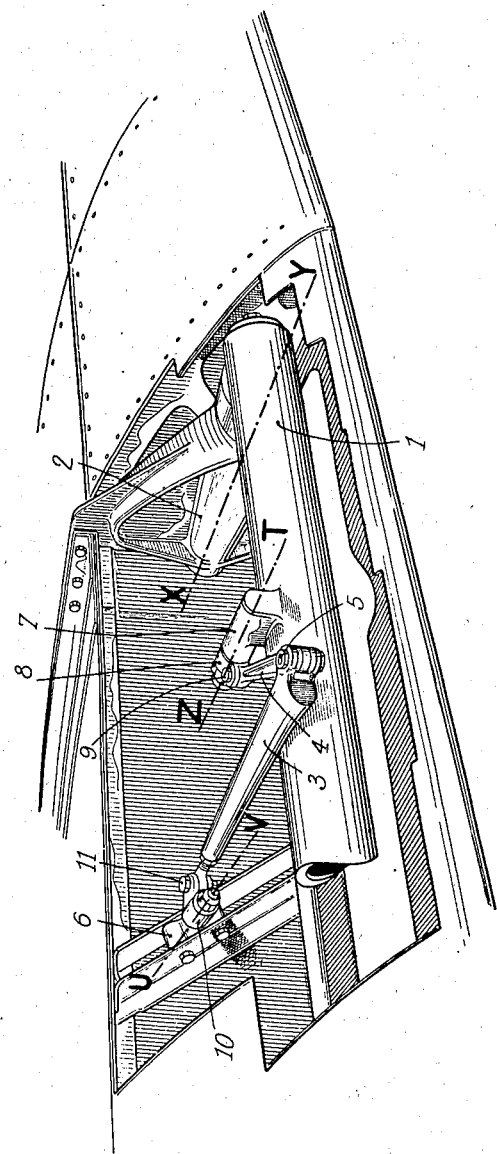

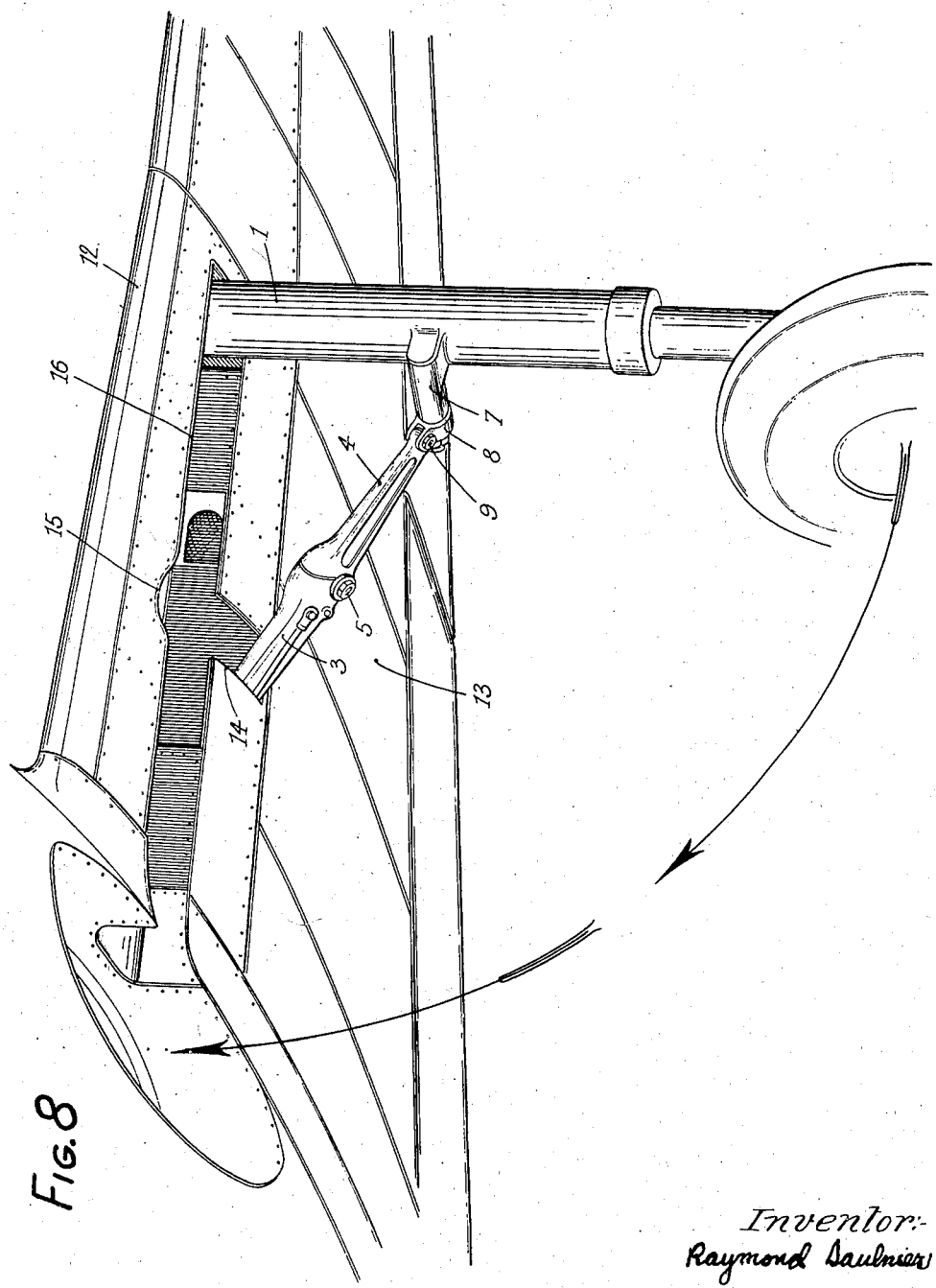

June 28, 1949.    R. SAULNIER    2,474,694
RETRACTABLE LANDING GEAR FOR AIRCRAFT
Filed Oct. 6, 1945    10 Sheets-Sheet 7

Inventor:-
Raymond Saulnier
By Brown & Leward
Attorneys

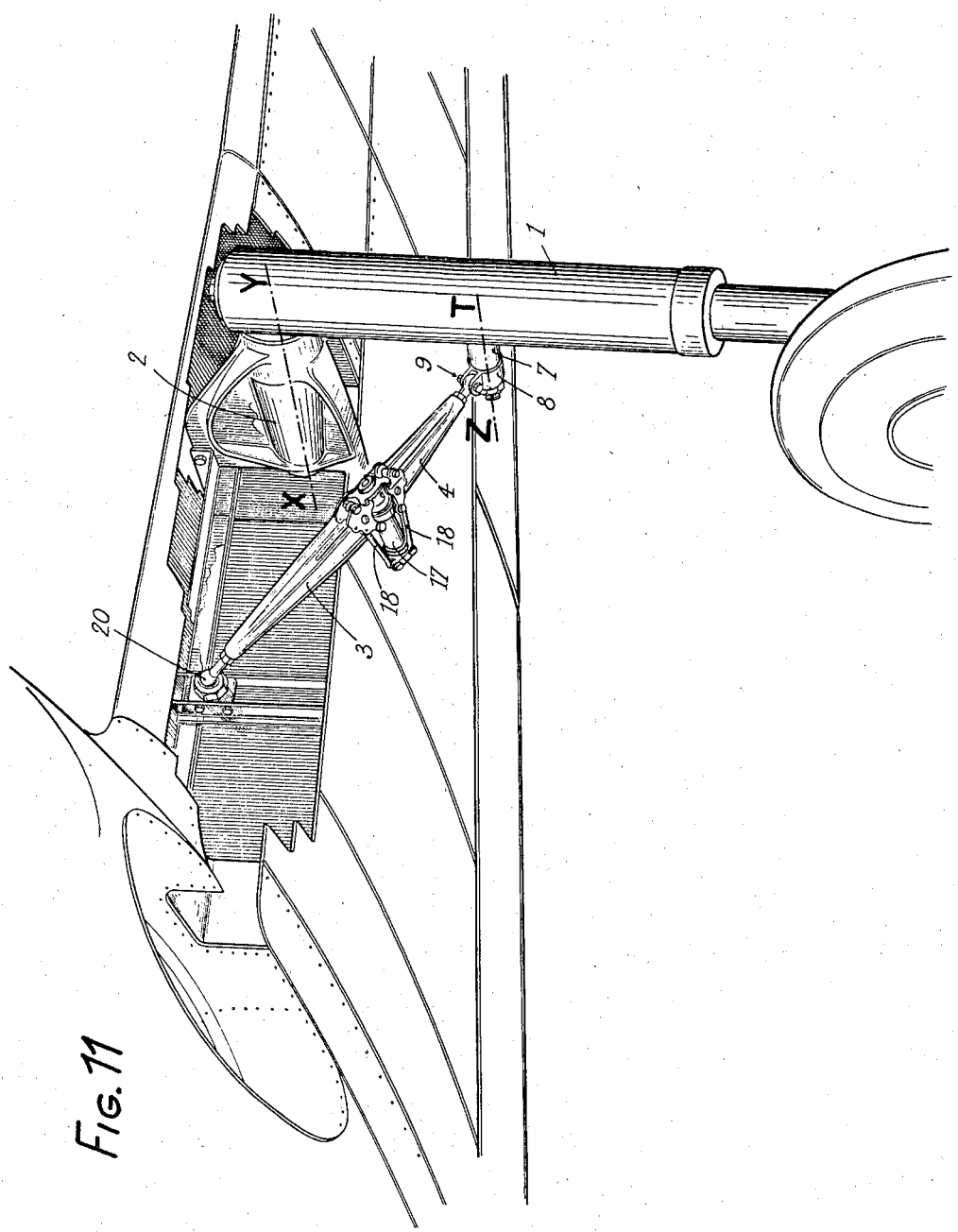

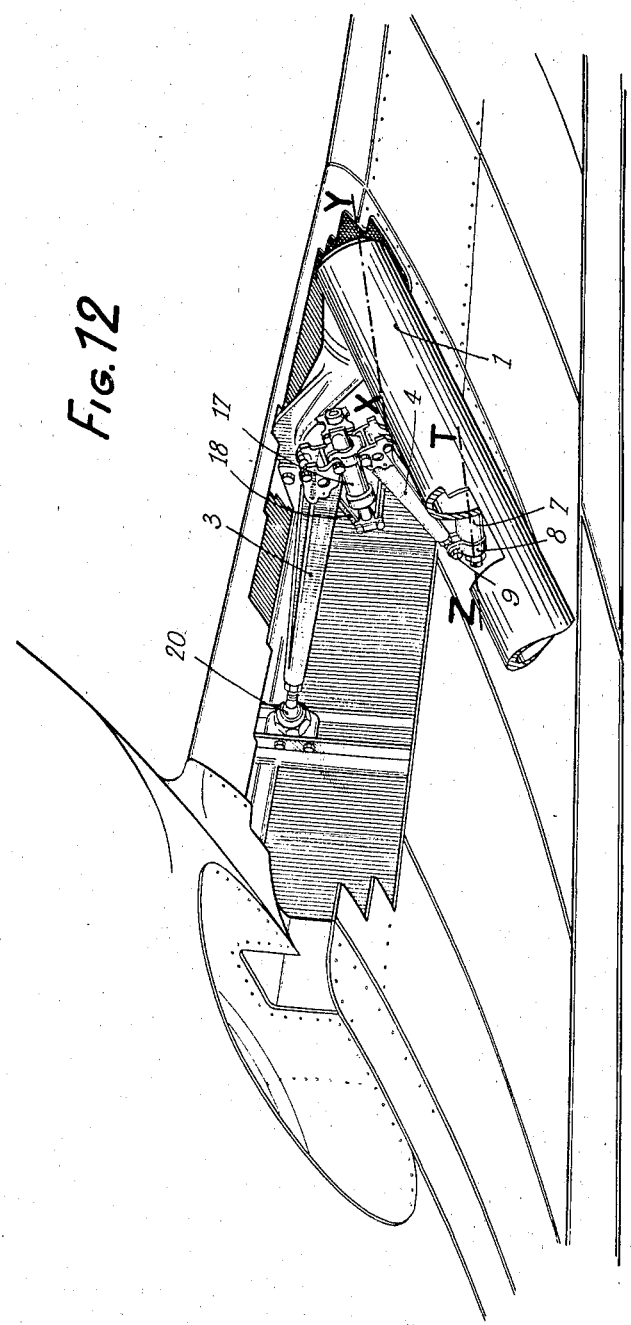

Patented June 28, 1949

2,474,694

UNITED STATES PATENT OFFICE 2,474,694

RETRACTABLE LANDING GEAR FOR AIRCRAFT

Raymond Saulnier, Paris, France

Application October 6, 1945, Serial No. 620,748
In France July 25, 1944

Section 1, Public Law 690, August 8, 1946
Patent expires July 25, 1964

13 Claims. (Cl. 244—102)

The present invention relates to retractable landing gears for aircrafts.

In the applicants' U. S. Patent No. 2,082,598, issued June 1, 1937, there is described a landing gear including a jointed strut arranged in such manner as to act both as a brace strut for keeping the landing gear in the lowered position when the airplane is on the ground and as means for retracting the landing gear when in flight.

In this landing gear, the folding of the brace strut in question was performed by means of a jack carried by said strut. The latter was located in a plane perpendicular to the axis of rotation of the shock strut. Therefore it folded in this plane and the control jack was necessarily located in said plane, which was transverse to the direction of flight of the airplane. The presence of this jack together with the rods through which it acted upon the brace strut, created a considerable drag during the take off and the period of flight preceding the retracting of the landing gear.

Furthermore, the arrangement of such a landing gear made it necessary to place both ends of the brace strut in a plane perpendicular to the axis of pivoting of the shock strut. This imposed constructional conditions which could be rather awkward due, for instance, to the fact that the hinging of the brace strut to the wing, or any other fixed portion of the airplane, necessitated the provision, on the wing spar, of a forwardly extending bracket.

The object of the present invention is to remedy these drawbacks. It consists essentially in hinging the two ends of the brace strut, respectively with the wing frame and with the shock strut, in such manner that said strut remains in a plane parallel to the direction of flight of the airplane.

It will be understood that, with such an arrangement, if the landing gear is of the type including, for operation thereof, a jack carried by the brace strut, this jack also remains in the plane, parallel to the direction of flight, which contains the brace strut. The drag is thus reduced to a minimum, and the parts can be housed in an aerodynamic fairing of narrow section and simple shape.

According to another feature of the invention, in combination with this way of hinging the brace strut to the shock strut and the airplane proper, the hinge of the brace strut with the airplane proper is located behind the hinge of the other end of the brace strut with the shock strut, which eliminates the above mentioned difficulties of construction and, in particular, makes it possible to hinge the brace strut directly on the wing spar.

It should be well understood that the landing gear according to the present invention is not limited to the case, as above considered, in which the folding of the brace strut is performed by a jack carried by this brace strut. The invention also applies to the case in which the landing gear is operated by means of any suitable device, such as hydraulic or pneumatic jack, an electric motor, etc., arranged in any suitable manner for performing the necessary operations. Whatever be the system that is chosen, the invention always has the advantage of giving the minimum of drag and also of permitting a particularly simple and strong construction when, according to the second feature above mentioned, the hinging of the brace strut with the wing takes place behind the hinge with the shock strut.

Other advantages of the present invention will be evident from the following description, with reference to the annexed drawings, in which:

Fig. 1 is a lateral elevational diagrammatic view of a landing gear made according to the present invention, this landing gear being shown in the lowered position;

Fig. 2 is an analogous view representing a first step in the retracting of the landing gear;

Fig. 3 is a similar view showing another intermediate step;

Fig. 4 is a diagrammatic elevational view of the landing gear of Figs. 1, 2 and 3, wholly retracted;

Fig. 5 is a perspective view of a landing gear the construction of which corresponds, in practice, to the diagrammatic showing of Figs. 1 to 4, this landing gear being shown in the lowered position. In this figure, the underside covering of the wing is partly removed so as to show the parts of the landing gear, this view corresponding to the position shown by Fig. 1;

Fig. 6 is a view, similar to Fig. 5, showing the parts of the landing gear at an intermediate time during retraction, this view corresponding to the position shown by Fig. 3;

Fig. 7 shows, in perspective view, the landing gear of Figs. 5 and 6 in the folded position, that is to say the position corresponding to the showing of Fig. 4, the upper side of the wing covering being partly removed so as to show the parts of the landing gear;

Fig. 8 is a view similar to Fig. 5, but in which the underside covering is complete in order to show the recess that is provided therein for the passage of the brace strut and the shock strut;

Figs. 11, 12 and 13 are views similar to Figs. 5, 6 and 7, respectively, but relating to an embodiment in which the brace strut carries the retracting control jack.

Figure 10:
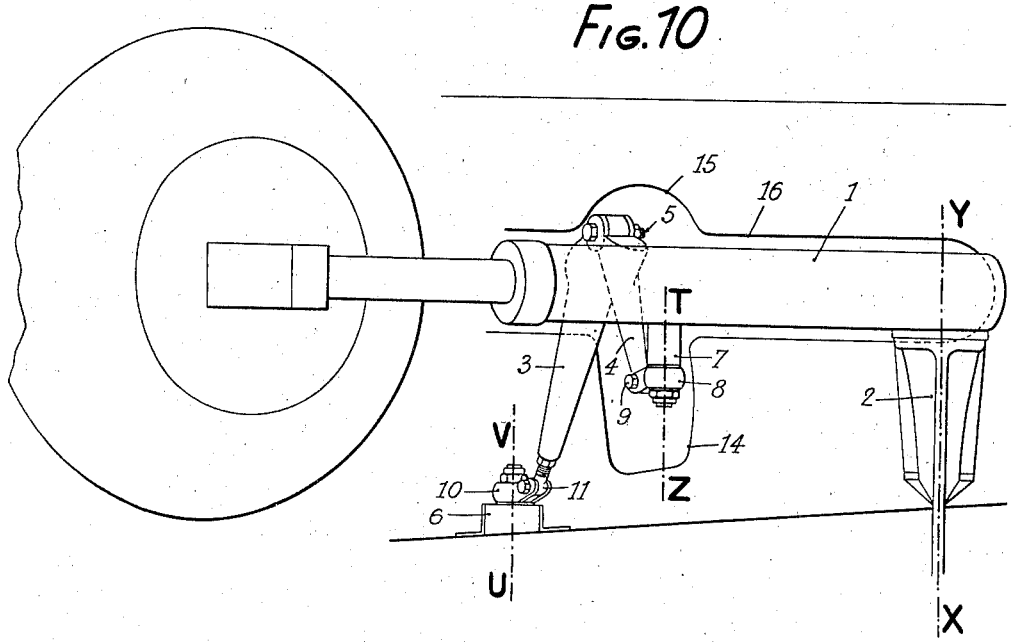
Fig. 10 is a bottom plan view of the same landing gear in the folded position.
Figure 9:
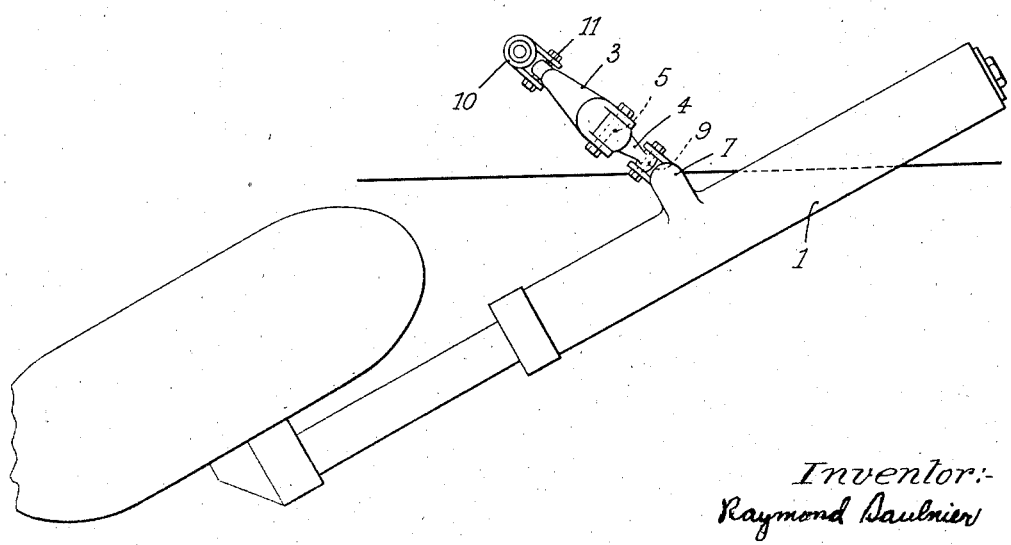
Fig. 9 is a diagrammatic end view corresponding to Fig. 6, but in which only the parts of the landing gear proper have been shown.

The folding gear according to the invention essentially includes a shock strut 1 pivotally mounted about the axis X—Y of a landing gear pivot 2 carried, for instance, by the wing frame and parallel to the direction of flight of the airplane, and a brace strut formed by elements 3 and 4 jointed together at 5 and the respective ends of which are hinged, on the one hand, to a part 6 carried by the wing frame and, on the other hand, to a part 7 carried by the shock strut at an intermediate point thereof.

According to the invention, the hinging of at least one of the elements 3, 4 with the airplane proper, and the strut 1 respectively, is devised in such manner as to keep said brace strut always in a plane parallel to the direction of flight of the airplane, that is to say parallel to X—Y.

For this purpose, for instance, as shown by the drawings, the sleeve, or analogous member, 8, on which the brace strut element 4 is hinged about an axis 9, parallel to the axis of hinge 5, is pivoted to the part 7 of strut 1 about an axis Z—T parallel to X—Y.

The desired result could also be obtained by pivoting to support 6 about an axis U—V parallel to X—Y, the part 10 to which the element 3 is hinged about axis 11.

Figure 13:
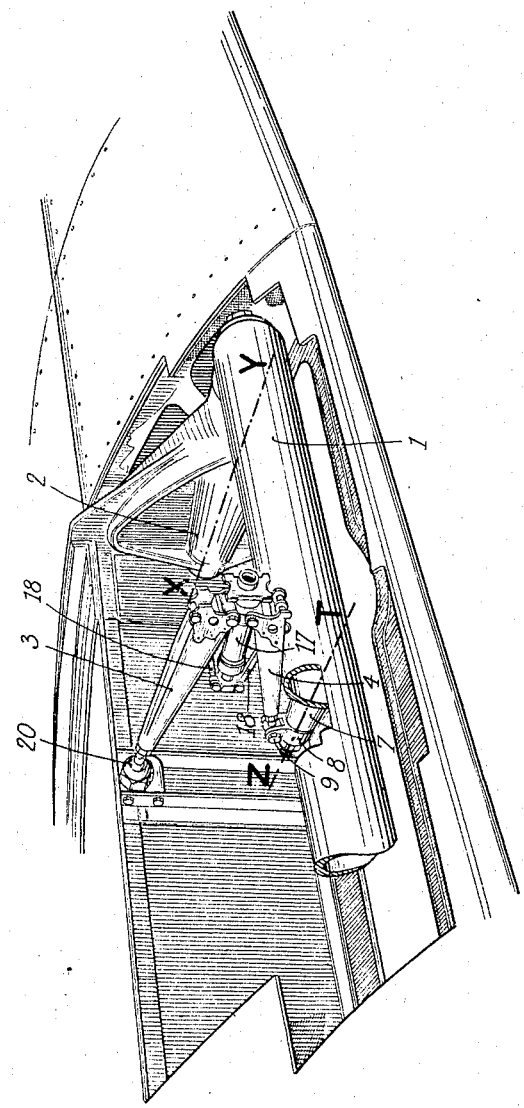

As a matter of fact, Figs. 1 to 10 show an embodiment in which both of the hinges at the respective ends of the brace strut 3—4 are made as above described. But, as above stated, this is not necessary according to the invention and it suffices to have only one of said hinges complying with the above mentioned condition, the other hinge being optionally a universal joint, Cardan joint, ball-and-socket joint, etc. This is what is shown by Figs. 11 to 13, in which the hinging of element 4 with part 7 is made as above described, while the hinging of element 3 with part 6 is obtained through a mere ball-and-socket joint 20.

Owing to the connections which have been described, the brace strut 3—4 is always located in a plane passing through the axes U—V and/or Z—T and consequently parallel to the axis X—Y. During retraction of the landing gear, several intermediate positions of which are shown by Figs. 1 to 10, this plane U—V, Z—T pivots about the axis U—V. This pivoting takes place first in the clockwise direction for coming from the position of Fig. 1 into a position which is substantially that of Fig. 3, then in the opposed direction, to end finally in the position of Fig. 4.

The operation of this device is as follows:

In the position of Fig. 1, the elements 3 and 4 of the brace strut are in line with each other, and preferably locked through any suitable device, not shown. The landing gear is therefore fixed in the position in which the airplane rests upon the wheels. After the take off, when the airplane has left the ground, the means locking elements 3 and 4 together are released through any suitable device while the breaking of the brace strut they form together is started. Then a motor device, not shown, and which may be of any suitable type, starts pivoting strut 1 about axis X—Y. The whole therefore first comes into the position of Fig. 2, then into that of Fig. 3, and finally the wheel comes to fit into its housing provided in wing 12, in a position for which the elements 3 and 4 are folded in a common horizontal plane passing through U—V, and/or the strut 1 is also brought into a horizontal position perpendicular to this direction U—V (see Fig. 7). In the course of this operation, the displacement of the brace strut is such that it suffices to provide (Fig. 8) in the underside 13 of the wing covering, a recess 14 eventually completed by a slight notch 15 extending transversely to the recess, 16, intended for the strut 1, the recesses thus formed having the minimum surface area.

In the embodiment of Figs. 11 to 13, the brace strut 3—4 carries the jack 17 intended for the operating of the landing gear. The fitting of this jack is effected, as described in applicant's above cited prior Patent No. 2,082,598, the rods 18, being each connected, on the one hand to one of the elements of the jack, and on the other hand, to one of the elements 3 or 4 of the brace strut.

Due to the above described construction of the landing gear, the jack is therefore located in the plane of the brace strut 3—4, which plane, as above stated, is parallel to the direction of flight, this being a great improvement over the embodiments described in the above cited prior patent. As a matter of fact, it will be understood that, when the airplane has just taken off and needs the whole of its power for climbing, it is particularly disadvantageous to have the presence of this jack in a direction transverse to the direction of flight adding a supplementary resistance to the drag of the airplane. With the device according to the invention, this drawback is avoided.

Whatever be the embodiment that is chosen, the landing gear device according to the invention has considerable advantages, certain of which have already been cited and among which the following should be stressed. If the folding of the brace strut has been performed in such manner that its hinge 5 is toward the front, which is always possible, and, in particular, is the case shown by the drawings, the aerodynamic pressure exerted on the brace strut when the landing gear is being lowered, tends to unfold the brace strut and to lock it in its straight position. Consequently, the action of air resistance tends to add itself to that of the motive power that performs the lowering of the landing gear. This is particularly interesting in case of failure of this motive power, and when only emergency means or merely the action of gravity can be relied upon for bringing the landing gear into its lowered position.

It should be well understood that the embodiments which have just been described and shown have been given merely by way of example and have no limitative character.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A retractable landing gear for an airplane which comprises, in combination, a shock strut pivotally mounted on said airplane about an axis parallel to the fore-and-aft direction thereof, a jointed brace strut interposed between said shock strut and said airplane, said brace strut being made of two parts pivoted to each other about an axis, so as to be able to form an angle having its apex turned toward the front, and two hinge means for connecting the respective ends of said brace strut to said shock strut and said airplane respectively, at least one of said hinge means consisting of a double pivot about two axes at right angles to each other and one of which is parallel to the fore-and-aft direction of the airplane while the other is parallel to the axis about which said two parts of the brace strut are pivoted to each other, the other of said hinge means being adapted to cooperate with the first mentioned one to keep said brace strut constantly in a plane parallel to said fore-and-aft direction irrespective of the position of said shock strut.

2. A retractable landing gear for an airplane which comprises, in combination, a shock strut pivotally mounted on said airplane about an axis parallel to the fore-and-aft direction thereof, a jointed brace strut interposed between said shock strut and said airplane, said brace strut being made of two parts pivoted to each other about an axis, so as to be able to form an angle having its apex turned toward the front, and two hinge means for connecting the respective ends of said brace strut to said shock strut and said airplane respectively, each of said hinge means consisting of a double pivot about two axes at right angles to each other and one of which is parallel to the fore-and-aft direction of the airplane while the other is parallel to the axis about which said two parts of the brace strut are pivoted to each other, whereby said brace strut is kept constantly in a plane parallel to said fore-and-aft direction irrespective of the position of said shock strut.

3. A retractable landing gear for an airplane which comprises, in combination, a shock strut pivotally mounted on said airplane about an axis parallel to the fore-and-aft direction thereof, a jointed brace strut interposed between said shock strut and said airplane, said brace strut being made of two parts pivoted to each other about an axis, so as to be able to form an angle having its apex turned toward the front, and two hinge means for connecting the respective ends of said brace strut to said shock strut and said airplane respectively, one of said hinge means consisting of a double pivot about two axes at right angles to each other and one of which is parallel to the fore-and-aft direction of the airplane while the other is parallel to the axis about which said two parts of the brace strut are pivoted to each other, the other of said hinge means being constituted by a ball and socket joint whereby said brace strut is kept constantly in a plane parallel to said fore-and-aft direction irrespective of the position of said shock strut.

4. A retractable landing gear for an airplane which comprises, in combination, a shock strut pivotally mounted on said airplane about an axis parallel to the fore-and-aft direction thereof, a jointed brace strut interposed between said shock strut and said airplane, said brace strut being made of two parts pivoted to each other about an axis, two hinge means for connecting the respective ends of said brace strut to said shock strut and said airplane respectively, at least one of said hinge means consisting of a double pivot about two axes at right angles to each other and one of which is parallel to the fore-and-aft direction of the airplane while the other is parallel to the axis about which said two parts of the brace strut are pivoted to each other, the other of said hinge means being adapted to cooperate with the first mentioned one to keep said brace strut constantly in a plane parallel to said fore-and-aft direction irrespective of the position of said shock strut, and a jack carried by said brace strut for controlling the angular position of the two parts thereof with respect to each other, said jack being mounted in the plane of said brace strut.

5. A retractable landing gear for an airplane which comprises, in combination, a shock strut pivotally mounted on said airplane about an axis parallel to the fore-and-aft direction thereof, a jointed brace strut interposed between said shock strut and said airplane, said brace strut being made of two parts pivoted to each other about an axis, two hinge means for connecting the respective ends of said brace strut to said shock strut and said airplane respectively, one of said hinge means consisting of a double pivot about two axes at right angles to each other and one of which is parallel to the fore-and-aft direction of the airplane while the other is parallel to the axis about which said two parts of the brace strut are pivoted to each other, the other of said hinge means being constituted by a ball and socket joint whereby said brace strut is kept constantly in a plane parallel to said fore-and-aft direction irrespective of the position of said shock strut, and a jack carried by said brace strut for controlling the angular position of the two parts thereof with respect to each other, said jack being mounted in the plane of said brace strut.

6. A retractable landing gear for an airplane which comprises, in combination, a shock strut pivotally mounted on said airplane about an axis parallel to the fore-and-aft direction thereof, a jointed brace strut interposed between said shock strut and said airplane, said brace strut being made of two parts pivoted to each other about an axis, so as to be able to form an angle having its apex turned toward the front, two hinge means for connecting the respective ends of said brace strut to said shock strut and said airplane respectively, at least one of said hinge means consisting of a double pivot about two axes at right angles to each other and one of which is parallel to the fore-and-aft direction of the airplane while the other is parallel to the axis about which said two parts of the brace strut are pivoted to each other, the other of said hinge means being adapted to cooperate with the first mentioned one to keep said brace strut constantly in a plane parallel to said fore-and-aft direction irrespective of the position of said shock strut, and a jack carried by said brace strut for controlling the angular position of the two parts thereof with respect to each other, said jack being mounted in the plane of said brace strut.

7. A retractable landing gear for an airplane which comprises, in combination, a shock strut pivotally mounted on said airplane about an axis parallel to the fore-and-aft direction thereof, a jointed brace strut interposed between said shock strut and said airplane, said brace strut being made of two parts pivoted to each other about an axis, so as to be able to form an angle having its apex turned toward the front, two hinge means for connecting the respective ends of said brace strut to said shock strut and said airplane respectively, one of said hinge means consisting of a double pivot about two axes at right angles to each other and one of which is parallel to the fore-and-aft direction of the airplane while the other is parallel to the axis about which said two parts of the brace strut are pivoted to each other, the other of said hinge means being constituted by a ball and socket joint whereby said brace strut is kept constantly in a plane parallel to said fore-and-aft direction irrespective of the position of said shock strut, and a jack carried by said brace strut for controlling the angular position of the two parts thereof with respect to each other, said jack being mounted in the plane of said brace strut.

8. A retractable landing gear for an airplane comprising, a shock strut pivotally mounted on said airplane for rotation about an axis, and a jointed brace strut pivoted at one end to said shock strut and at the other end to said airplane, at least one of the ends of said brace strut being pivoted to the adjoining member by a joint having at least two axes, one parallel to the first named shock strut axis and the other adapted to determine the direction of folding of the brace strut, the opposite end of said brace strut being pivoted to its adjoining member by a joint having an axis parallel to the second of said two axes.

9. A retractable landing gear according to claim 8 in which the shock strut is pivotally mounted on said airplane for rotation about an axis parallel to the fore-and-aft axis of the airplane.

10. A retractable landing gear according to claim 8 in which the point at which the brace strut is pivoted to the airplane is nearer the rear of the airplane than is the point at which the shock strut is pivoted to the airplane.

11. A retractable landing gear according to claim 8 in which the point at which the brace strut is pivoted to the airplane is nearer the rear of the airplane than is the point at which the shock strut is pivoted to the airplane, and in which the shock strut is pivotally mounted on said airplane for rotation about an axis parallel to the fore-and-aft axis of the airplane.

12. A retractable landing gear for an airplane comprising, a shock strut pivotally mounted on said airplane for rotation about an axis, and a jointed brace strut pivoted at one end to said shock strut and at the other end to said airplane, at least one of the ends of said brace strut being pivoted to the adjoining member by a joint having at least two axes, one parallel to the first named shock strut axis and the other so disposed as to cause the brace strut to fold in a plane parallel to the direction of flight.

13. A retractable landing gear for an airplane comprising, a shock strut pivotally mounted on said airplane for rotation about an axis, and a jointed brace strut pivoted at one end to said shock strut and at the other end to said airplane, at least one of the ends of said brace strut being pivoted to the adjoining member by a joint having at least two axes, one parallel to the first named shock strut axis and the other so disposed as to cause the brace strut to fold in a plane parallel to the direction of flight, the opposite end of said brace strut being pivoted to its adjoining member by a joint having an axis parallel to the second of said two axes.

RAYMOND SAULNIER.

REFERENCES CITED

The following references are of record in the file of this patent:

UNITED STATES PATENTS

| Number | Name | Date |
|---|---|---|
| 2,082,598 | Saulnier | June 1, 1937 |
| 2,323,385 | Eddy | July 6, 1943 |
| 2,326,020 | Dowty | Aug. 3, 1943 |

FOREIGN PATENTS

| Number | Country | Date |
|---|---|---|
| 364,141 | Italy | Oct. 22, 1938 |
| 440,358 | Great Britain | Dec. 27, 1935 |